United States Patent [19]

Kostovski

[11] 4,328,270
[45] May 4, 1982

[54] ART OF MAKING LATCH HOOKED ARTICLES

[76] Inventor: Momchilo Kostovski, 5824 W. Higgins Rd., Chicago, Ill. 60630

[21] Appl. No.: 146,060

[22] Filed: May 2, 1980

[51] Int. Cl.³ .......................... B32B 3/10; D05C 15/00
[52] U.S. Cl. ......................................... 428/43; 428/95; 428/134; 428/137; 428/138; 428/197; 428/255; 156/72
[58] Field of Search ................. 428/43, 131, 134, 136, 428/137, 138, 255, 95, 197; 156/72

[56] References Cited

U.S. PATENT DOCUMENTS 2,958,325 11/1960 Claydon et al. ................. 428/43 X
3,762,985 10/1973 Chaitman ............................ 428/43

Primary Examiner—George F. Lesmes
Assistant Examiner—Alexander S. Thomas
Attorney, Agent, or Firm—Paul H. Gallagher

[57] ABSTRACT

Latch hooked articles are made with a foraminous web having an overlying web laminated thereto, the latter having selected areas depicted thereon marking the placing of strand material to be secured to the backing web and having lines of weakness therein to facilitate the insertion of a latch hook bearing strand material through the openings in the backing web for securement to the backing web.

1 Claim, 5 Drawing Figures

ART OF MAKING LATCH HOOKED ARTICLES

SUMMARY OF THE INVENTION

Heretofore foraminous backing webs for latch hooking have had graphics of the design placed thereon in any convenient fashion. By reason of the openings in the backing material the boundaries of the discrete areas marking the graphic design are not clearly marked, and this is particularly bothersome to people having faulty eyesight, for example.

According to this invention an overlying web of thin resinous material is placed over the backing web and laminated thereto. Prior to so doing the overlying web is provided with suitable design, and the overlying web is provided with defined small areas corresponding to the discrete open areas of the backing web. Such areas are made to register with the open areas of the backing web, and each area in the overlying web is provided with intersecting lines of weakness which readily permit the insertion of the latch hook for securement of the strand material to the backing web.

THE DRAWINGS

Figure 1:
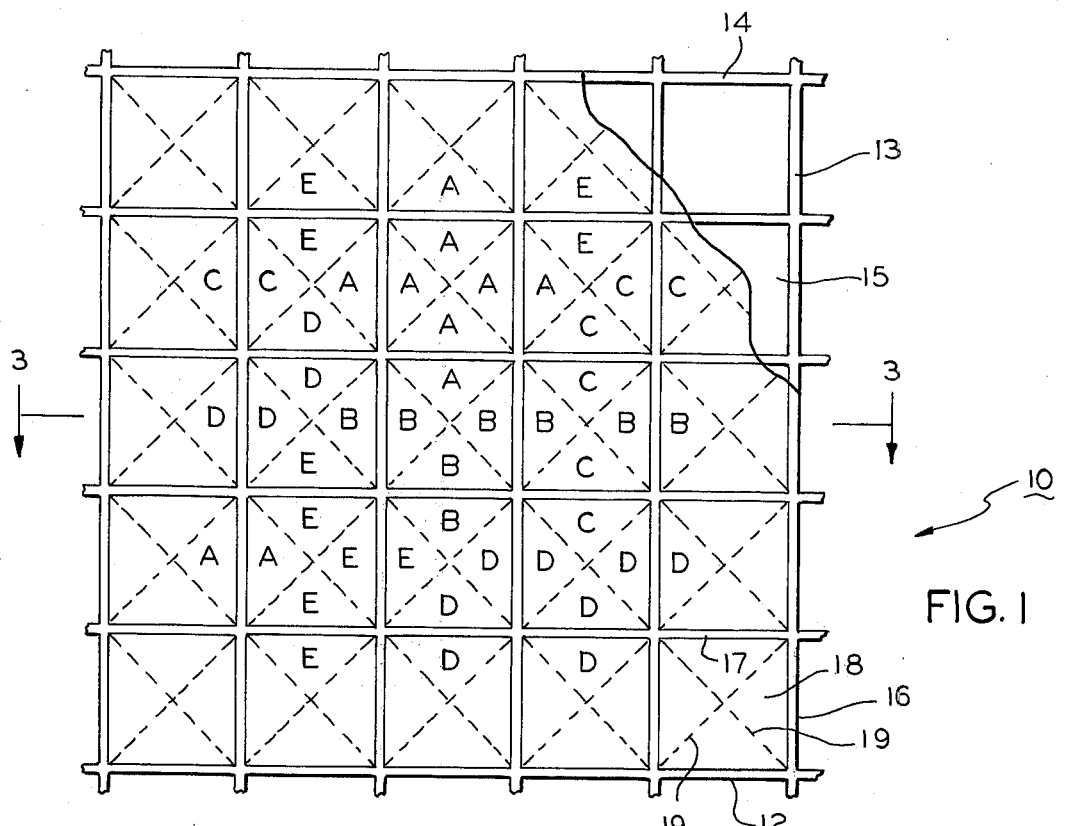
FIG. 1 is a plan view illustrating a portion of a structure for making a latch hooked article, said view being to an enlarged scale.
Figure 3:
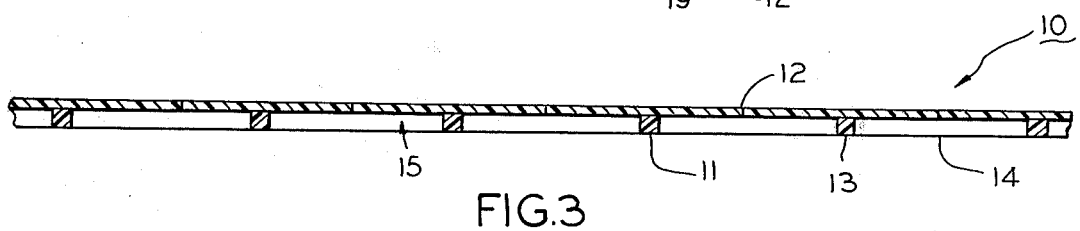
FIG. 3 is a section taken along the line 3—3 of FIG. 1 looking in the direction of the arrows.

The invention structure is denoted generally by the reference numeral 10 and consists of a foraminous backing web 11 covered by an overlying web 12 laminated to backing web 11.

Backing web 11 consists of longitudinally extending filaments 13 intersected by transverse extending filaments 14 defining generally rectangular openings 15. The filaments 13 and 14 may be of cellulosic material coated suitably to give stiffness to web 11.

Overlying web 12 is made of a thin sheet of resinous film of any suitable material, and is capable of receiving any suitable graphics to be transferred as patches of color by any suitable graphic process. The colored areas serve as a guide for locked strands S to be secured to web 11 by a latching tool T. The latter is not shown in detail, and it is well known in the art.

Overlying web 12 is configured with a design made up of areas each defined by transverse extending lines 17 and longitudinally extending lines 16 marking areas 18. Lines 17 and 16 are placed on web 12 by any suitable graphic process and they are in register with the filaments 13 and 14 of backing web 11, areas 18 of web 12 being in register with openings 15 of web 11.

Figure 2:
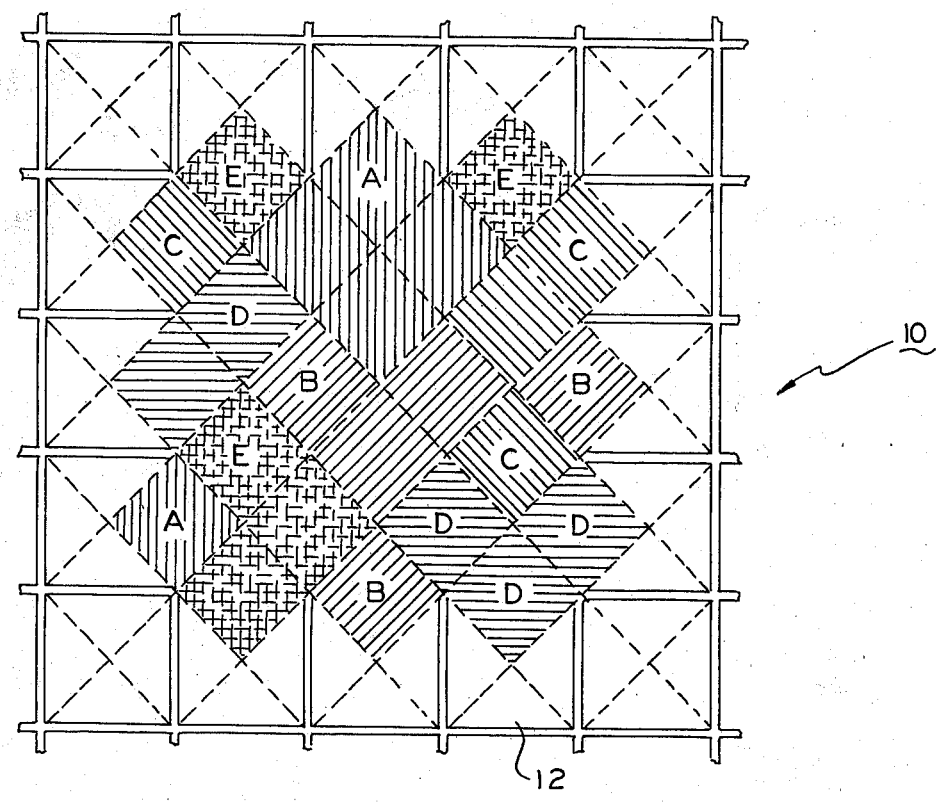
FIG. 2 is a plan view similar to FIG. 1 showing an overlying web provided with selected areas marking designs it is desired to incorporate into a finished latch hooked article.

Web 12 is provided with diagonal lines of weakness 19 dividing each area 18 into four sub areas. As seen in FIGS. 1 and 2 the areas are colored differently, the colors being denoted by the letters A, B, C, D and E. It should be noted that each color area, of whatever shade, lies across both the filaments of backing web 11 and the lines of 17 and 16 of overlying web 12.

Figure 5:
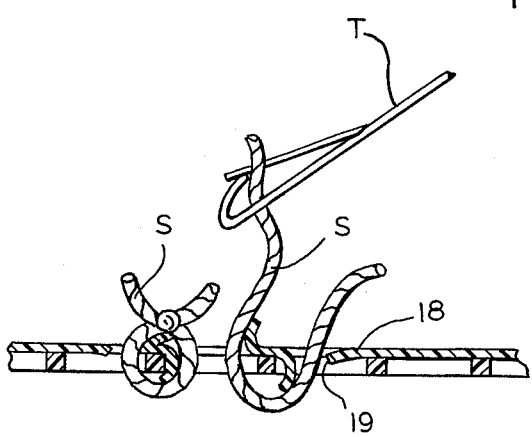
FIG. 5 is a section through the structure showing a strand fixed in position and one being fixed into position.
Figure 4:
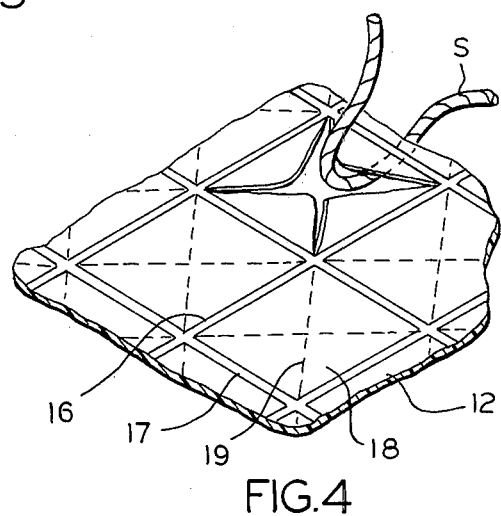
FIG. 4 is an isometric view of a portion of the structure seen in FIGS. 1 and 3, showing the manner in which strand material is secured thereto.

As seen in FIGS. 4 and 5 the strands S are locked around both the filaments 13 and 14 of web 11 and the lines 17 and 16 of overlying web 12. The colors of strand S are selected in accordance with the graphics on web 12. The tool T together with its strand S readily pierces the areas 18 at the lines of weakness 19. It will be noted that within a given area 18 of web 12 more than one color may be depicted therein for guidance of the hobbiest.

I claim:

1. A latched hooked article comprising,
   (1) a foraminous backing web having mutually intersecting filaments defining and surrounding generally rectangular openings in the backing web,
   (2) an overlying web secured to the backing web,
   (3) the overlying web having mutually intersecting lines of weakness positioned diagonally from the corners of the rectangular openings so as to extend across and in register with central portions of the generally rectangular openings of the backing web, the lines of weakness at their points of intersection forming points of weakness at said central portions which indicate points of, and facilitate, insertion of a latch hook through the overlying web, for hooking strand material on adjacent filaments, and the lines of weakening defining and surrounding areas of identification superposed over and in register with respective filaments, and
   (4) the overlying web having colors or letters in said areas thereof for indicating corresponding filaments, and the colors or letters being diversified for indicating different colors of strand material to be hooked on the respective filaments.

* * * * *